United States Patent [19]
Mayer et al.

[11] Patent Number: 6,012,057
[45] Date of Patent: Jan. 4, 2000

[54] HIGH SPEED DATA SEARCHING FOR INFORMATION IN A COMPUTER SYSTEM

[75] Inventors: Laurance W. Mayer, Pacific Palisades; Daniel S. Spear, Beverly Hills, both of Calif.

[73] Assignee: Quarterdeck Corporation, Santa Monica, Calif.

[21] Appl. No.: 08/902,664

[22] Filed: Jul. 30, 1997

[51] Int. Cl.[7] .................................................. G06F 17/30
[52] U.S. Cl. ........................................ 707/6; 707/3; 707/5
[58] Field of Search ........................... 707/2, 5, 6, 203, 707/530; 341/51

[56] References Cited

U.S. PATENT DOCUMENTS

| | | | |
|---|---|---|---|
| 5,150,119 | 9/1992 | Yoshida et al. | 341/51 |
| 5,410,671 | 4/1995 | Elgamal et al. | 711/202 |
| 5,426,779 | 6/1995 | Chambers, IV | 707/6 |
| 5,442,350 | 8/1995 | Iyer et al. | 341/51 |
| 5,572,209 | 11/1996 | Farmer et al. | 341/67 |
| 5,600,826 | 2/1997 | Ando | 707/103 |
| 5,606,654 | 2/1997 | Schuur | 345/708 |
| 5,610,603 | 3/1997 | Plambeck | 341/51 |
| 5,613,117 | 3/1997 | Davidson et al. | 345/440 |
| 5,627,748 | 5/1997 | Baker et al. | 707/531 |
| 5,654,703 | 8/1997 | Clark, II | 341/51 |
| 5,710,916 | 1/1998 | Barbaraet Al | 707/9 |
| 5,717,924 | 2/1998 | Kawai | 707/102 |
| 5,768,480 | 6/1998 | Crawford, Jr. et al. | 395/62 |
| 5,799,299 | 8/1998 | Fujiwara | 707/3 |
| 5,878,411 | 3/1999 | Burroughs et al. | 707/4 |
| 5,893,087 | 4/1999 | Wlaschin et al. | 707/3 |
| 5,905,988 | 5/1999 | Schwartz et al. | 707/104 |
| 5,915,240 | 6/1999 | Karpf | 705/2 |

*Primary Examiner*—Paul R. Lintz
*Assistant Examiner*—Ella Colbert
*Attorney, Agent, or Firm*—Hecker & Harriman

[57] ABSTRACT

Efficiencies in searching and matching information in a computer system are achieved using embodiments of the invention. The invention can be used, for example, to build and utilize a dictionary of data for string replication compression. The data matching mechanism can also be applied to other situations where it is necessary to find a sequence of data in a data buffer (e.g. looking for a particular series of words, letters, or numbers in an online document). As a result of processing a current string using the data dictionary, it is possible to find a previously-processed dictionary string that has the greatest number of initial characters in common with the current string, and a location at which the current string can be inserted into the dictionary tree. A count field is used to improve the speed of searching for matched strings.

16 Claims, 8 Drawing Sheets

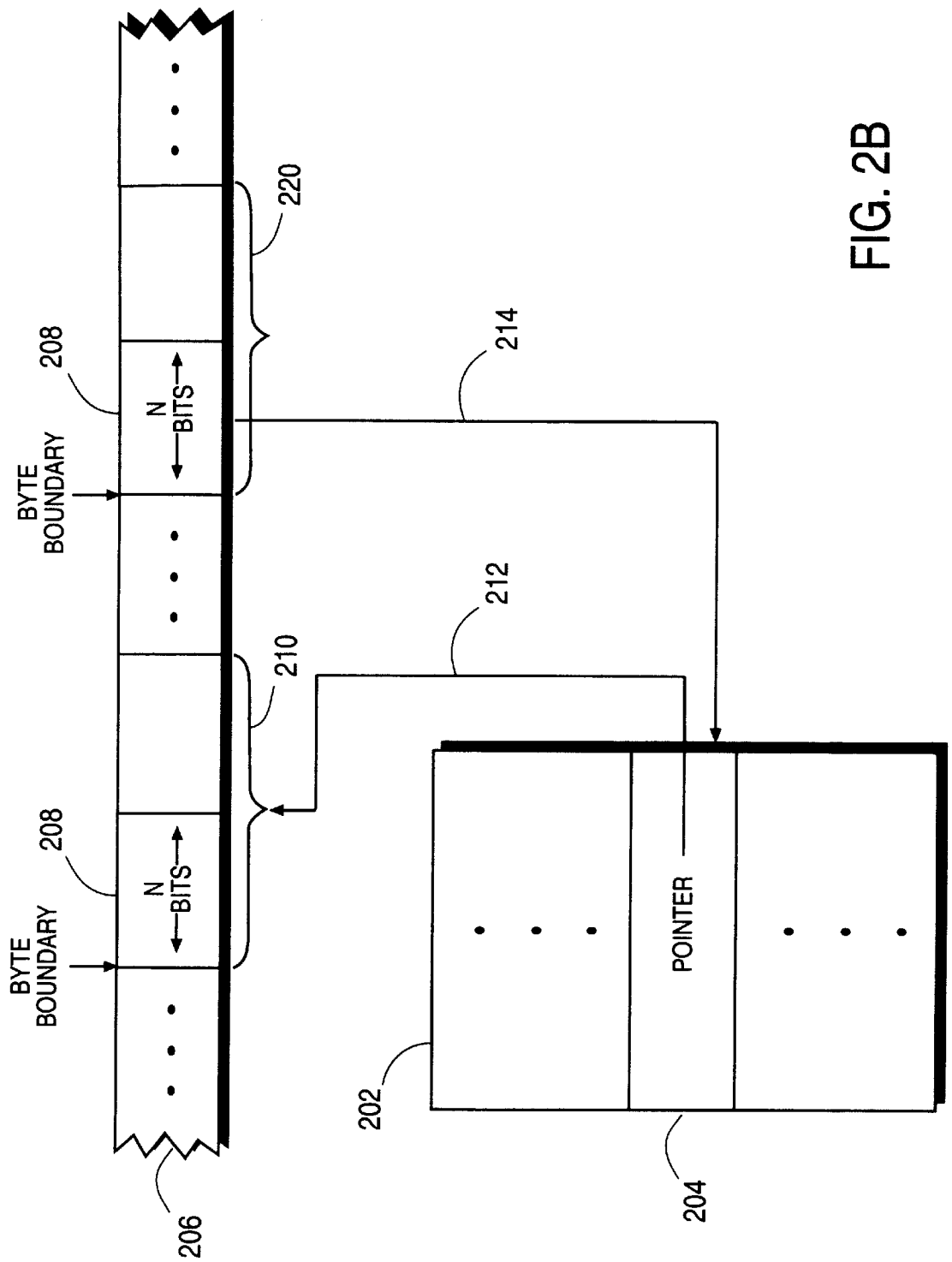

HIGH SPEED DATA SEARCHING FOR INFORMATION IN A COMPUTER SYSTEM

BACKGROUND OF THE INVENTION

1. Field of the Invention

This invention relates a method and apparatus for high speed data searching including buffered data searching.

2. Background Art

Information can be manipulated using a computer system. Information is stored in a computer system in the form of binary digits (bits). Typically, information is stored on a medium such as a hard disk drive or floppy disk drive and read into the memory of a computer system for access by the system's central processing unit (CPU). The content of the information can be searched using the resources (e.g., central processing unit time, memory, etc.) of the computer system. Efficiencies in searching technique can reduce the resources expended for a search.

One example of an application that searches information is compression. A compression application searches information to generate a new, more compact version of the information. Compression can be used to reduce the amount of memory needed to store information in a computer system. Information can be compressed prior to its transmittal to another computer system thereby reducing the time needed to transmit the information. Further, compression can be used to optimize the size of information thereby optimizing the transmission of information between computer systems (e.g., modem communications and downloading Internet graphics, etc.). By increasing the efficiency of compression, a computer system's finite set of resources can be further optimized.

In one compression scheme, referred to as run-length encoding, the compression mechanism searches information to find a repeating character sequence that can be replaced by one occurrence of the character and a number, x, that reflects the number of times the character is to be repeated. The string is decoded by inserting x occurrences of the character in the string.

A second type of string compression mechanism creates a dictionary that contains entries derived from the information. Entries in the dictionary can be used to encode subsequent string input. Each entry in the dictionary is a substring from the string input. As a substring of the string input is being processed, the dictionary is searched to determine whether the substring matches a substring contained in a dictionary entry. If a match is found, it is assumed that the substring occurred previously in the string input. Thus, the substring can be replaced in the compressed representation (i.e., the output of the encoding process) with a pointer to the previous occurrence. If it is determined that the substring is unique, it is copied into the compressed representation and is added to the dictionary and can be used in comparisons with subsequent substrings in the string input. A product, MagnaRam™, is available from Quarterdeck Corporation that creates a dictionary from a data buffer for the purpose of string compression.

Existing compression mechanisms can be used to optimize a computer system's finite set of resources. Compression applications, as well as other applications, need to search information stored in a computer system. It is, therefore, advantageous to increase efficiency to reduce the amount of finite resources that are used in searching. It is beneficial to develop more efficient searching to make applications that perform searching more efficient.

SUMMARY OF THE INVENTION

Efficiencies in searching and matching information in a computer system are achieved using embodiments of the invention. The invention can be used, for example, to build and utilize a dictionary of data for string replication compression. The data matching mechanism can also be applied to other situations where it is necessary to find a sequence of data in a data buffer (e.g. looking for a particular series of words, letters, or numbers in an online document). As a result of processing a current string using the data dictionary, it is possible to find a previously-processed dictionary string that has the greatest number of initial characters in common with the current string, and a location at which the current string can be inserted into the dictionary tree. A count field is used to improve the speed of searching for matched strings.

In an embodiment of the invention, a dictionary is used that is comprised of an array of bifurcated dictionary trees. The dictionary is used to store pointers to strings (i.e., their location in the input string) previously entered into the dictionary. The first N bits in each processed string are used as an index into the array. The array contains $2^N$ entries. Having an array of dictionary trees, rather than a single dictionary tree, avoids extraneous comparisons of strings whose first N bits are known not to match. An appropriate value of N can be chosen based upon the requirements of the search application. Higher values of N will minimize the number of searches but will increase the overhead in the maintenance of the dictionary trees.

As a current string is processed for encoding, the dictionary tree array is queried to find a string previously entered in the dictionary which matches at least the first few bits of the current string. If no match is found (i.e. the appropriate dictionary tree is empty), the current string is added to the dictionary by entering its offset at the top of the appropriate dictionary tree.

If a match is found (i.e., the appropriate dictionary tree is not empty), the dictionary tree is traversed in search of the best (or optimal) match to the current string. One goal of the searching process is to find a dictionary string that has the greatest number of initial characters in common with the current string. Each entry in the dictionary tree can be linked to two previously-processed strings—one link can contain a reference to a string that is "lower" in value than the dictionary entry in sort order and one link to a string that is "higher" in value than the dictionary entry. Either link could be null (e.g., not contain a valid value) if no such previous string has been processed.

Thus, instead of searching the entire set of possible matches, the average traversal through a directory tree would require $\log_2 X$ string comparisons, where X is the number of strings already stored in the tree (e.g. 512 existing entries would require 9 comparisons). Since there are N separate trees in the dictionary, a dictionary with X existing entries would only require $\log_2(X/N)$ string comparisons to find the optimal match.

Once the current string's best match has been identified, the current string can be inserted into the dictionary tree. The string could be inserted at the end of the tree (replacing an empty link that was found after traversing all the way through the tree).

The invention adds a datum associated with each link in the dictionary tree—a "count value" for the number of bytes that match between the tree entry and its link. For example, if the string "underarm" were in the dictionary and had the entry "underage" as its "lower" link, it would also have a count value of 6 for the number of bytes that match that link; if its "higher" link were the string "underbelly," then it would have a count value of 5 for the number of bytes that match that link.

The count value is used to minimize or possibly eliminate the comparisons that are performed to identify the dictionary entry that best matches the current string. The specific algorithm can be described in three cases. If the current string matches a string in the dictionary tree for matched bytes, the current string is before the string in sort order and the dictionary string matches for count bytes with its "lower" link, then (a) if matched<count, the current string matches for matched bytes with the linked string and is before the linked string, so the linked string's "lower" link can be examined and no string comparison on the current link is needed; (b) if matched=count, the current string must be compared to the "lower" link string, but the comparison can begin matched bytes into both strings; (c) if matched>count, the current string is after the linked string. Therefore, the linked string's "higher" link can be examined and no string comparison on the current link is needed. A similar approach applies if the current string is after the string in the dictionary tree (with the opposite link examined in each case).

The result is to reduce the number of comparisons required to traverse the dictionary tree, and to reduce the number of bytes that must be compared at each link. The size of the savings will increase as the similarity of the entries in the tree increases.

For a number of reasons, the invention is particularly appropriate for use with string replication compression algorithms. First, the invention uses memory to maintain a dictionary—each entry in the dictionary has two pointers and two count values associated with it. In string replication compression algorithms, it is optimal to examine relatively small windows of data at a time, so the memory requirements of the invention are likely to be acceptable. The increased speed of the dictionary tree management offered by the invention can be critical to string compression algorithms, which often must be used in real-time situations (e.g. modems, disk access, memory paging, etc.). Further, in string replication compression it is useful to look at the data without regard to lexical issues (i.e. word boundaries and distinctions between text and data are unimportant), so the algorithm's freedom from lexical issues is useful.

An entry in the dictionary may be empirically observed to have a higher instance rate than other entries. One or more separate arrays can be used to handle strings that have been found to occur more frequently in the input data. Some number of bits beyond N bits in the string can be used to index into the separate array(s). An entry in the separate array is then used as the root of a dictionary tree that can be searched to find an optimal match for the string.

BRIEF DESCRIPTION OF THE DRAWINGS

FIG. 2B illustrates a dictionary tree implemented as a table created from a data buffer according to one embodiment of the invention.

DETAILED DESCRIPTION OF THE INVENTION

A method and apparatus for high speed searching is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
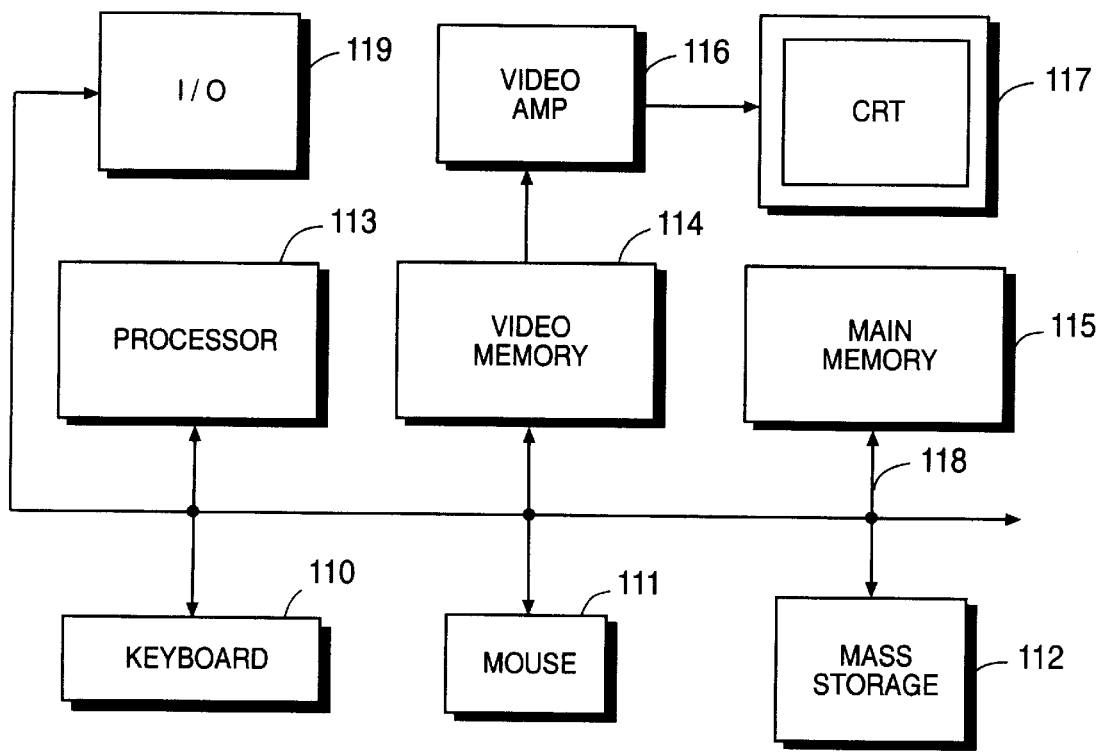
FIG. 1 provides an example of a general purpose computer that can be used in an embodiment of the invention.

The present invention can be implemented on a general purpose computer such as illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplex DATA/address lines may be used instead of separate DATA and address lines.

In the preferred embodiment of this invention, the CPU 113 is a 32-bit microprocessor manufactured by Motorola, such as the 680x0 or Power PC processor or a microprocessor manufactured by Intel, such as the 80x86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images.

The computer system described above is for purposes of example only. The present invention may be implemented in any type of computer system or programming or processing environment. Further, embodiments of the invention can be used in embedded systems (e.g., modems).

Embodiments of the invention provide high speed data dictionary creation. A data dictionary can be used for high speed searching and string matching, for example. Embodiments of the invention can be used in, for example, data compression. Further, embodiments of the invention can be used to convert a data buffer into a searchable database (e.g., finding particular sequences of letters in an online encyclopedia).

Bifurcated dictionary trees, are created from input data (e.g. Buffered data). An entry in the dictionary trees contains a pointer to a string in the input data that has already been processed (i.e., a processed string). An entry in the dictionary tree can have an associated "higher" link to a string that is "higher" in value and a "lower" link to a string that is "lower" in value. Identification of matching strings is facilitated using the bifurcated structure. That is, the bifurcated structure can be used to select 1 of 2 links thereby halving the number of comparisons that must be done to identify a "best match" at each node in a dictionary tree. A separate set of trees can be used to identify strings that empirically occur more frequently to avoid sequences (e.g., character or bit) that are too long, and therefore maintain high speed comparisons.

The dictionary creation and utilization of one or more embodiments of the invention is described herein with reference to a string replication compression application. However, it should be apparent that embodiments of the invention can be used with other applications as well.

Encoding Mechanism

In the string replication compression mechanism, an encoding mechanism is used to find data from earlier in the data buffer which best matches (e.g., matches the maximum number of initial bytes of) the string currently being processed. If a match is found for the string, the string is encoded as a compressed representation of the string. For example, the string can be represented as a pointer to a previous string that matched the string.

As string input is being processed during the encoding process, a dictionary tree is created that contains substrings from the string input to the encoding process. As a subsequent string is being processed, the dictionary tree is referenced in an attempt to find an optimal match between the subsequent string and a previously processed string.

It is possible to perform the encoding process in two distinct steps. For example, if a data buffer contains strings to be input to the encoding mechanism, a first step can process the data buffer to build the dictionary tree. Once the dictionary tree is created, a second step can process the dictionary to compress the data. A single pass is used that performs both steps on a string in the data buffer before processing the next string in the data buffer.

The implementation of steps one and two are both critical to the speed of the compression mechanism. That is, the technique used for finding matching data from earlier in the data buffer is critical to the speed of the compressor and the depth of the search can be critical to the achievement of a high compression ratio. The mechanism for creating a compressed representation of the data based upon the results from the matched data can be critical to the speed of the compressor and is critical to the achievement of a high compression ratio.

Bifurcated Dictionary Tree

Figure 2A:
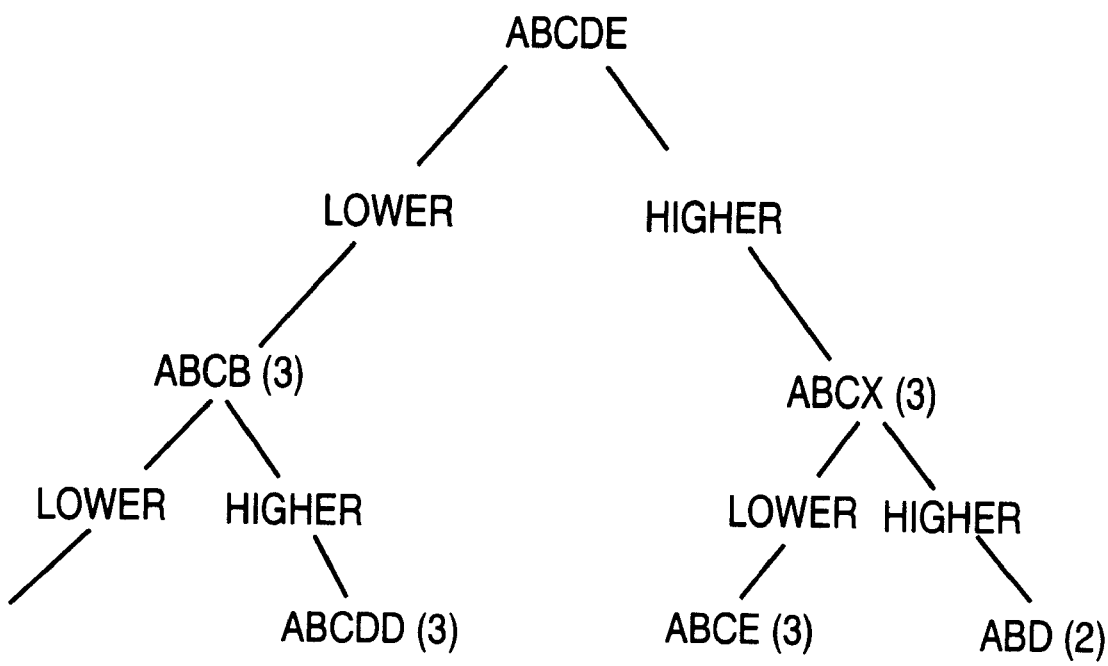
FIG. 2A provides an illustration of a dictionary tree segment according to one embodiment of the invention.

To encode an input string, a dictionary is created as a tree of possible occurrences of strings in an input string. FIG. 2A provides an illustration of a dictionary tree segment according to one embodiment of the invention. Dictionary tree 200 contains entries created during encoding. Entry ABIDE has lower and higher links (or children) that point to strings that are lower or higher in value, respectively, than ABCDE. For example, entry ABCB is a string that is lower in value than ABCDE. Entry ABCX is higher than ABCDE and is therefore its "higher" link in dictionary tree 200.

There can be multiple levels to dictionary tree 200. For example, entry ABCB is a child of ABCDE and the parent of a higher-valued string (i.e., ABCDD). Entry ABCB does not yet have a child that is lower in value. Similarly, ABCX has a child that is higher in value (i.e., ABD) and a child that is lower in value (e.g., ABCE).

Dictionary tree 200 can be stored as one or more tables. For example, FIG. 2B illustrates a dictionary tree implemented as a table created from a data buffer according to one embodiment of the invention. It should be apparent that a dictionary tree can be implemented as other than a table (e.g., a linked list).

Data buffer 206 is comprised of bytes of information that comprise strings. Array 202 contains entries that point to strings from data buffer 206 that have previously been processed by the encoding mechanism. Initially, entries in array 202 are overwritten with values that are known to be invalid (e.g., a value outside the range of valid pointer values). As strings from input string 206 are processed, the array is modified to include pointers to strings in data buffer 206. Array 202 comprises a set of pointers to strings in data buffer 206 whose first N bits reference an entry in array 202.

Array 202 is used to locate a previous string that becomes the root of a dictionary tree that can be searched to find an optimal match. To identify the previous string, the first N bits of the current string are used as an index into array 202. If a pointer exists in array 202 in the entry indexed by the current string's first N bits, the pointer points to a previous string from data buffer 206.

For example, the value defined by bits 208 is used as an index into array 202. Bits 208 of string 210 are used as an index into array 202. If entry 204 is empty (i.e., does not contain a valid pointer), a pointer is stored in entry 204 that points to string 210 (e.g., pointer 212). In this case, entry 204 contains a pointer to the first string in data buffer 206 containing bits 208. However, it is not necessary that entry 204 point to the first such string encountered in data buffer 206.

If it is assumed that bits 208 of string 220 are equal to bits 208 of string 210, entry 204 can be referenced when string 220 is processed thereby providing an entry into the dictionary tree whose root is string 210. Bits 208 therefore provide an efficient scheme for identifying an initial location in a dictionary tree at which a matching operation can be performed. The search for an optimal match for string 220 can start with string 210. The search can continue to find an optimal match via links to other previously processed strings starting with the links associated with string 210 until an empty link is encountered. At this point, the match that yielded the greatest number of like initial characters is considered to be the optimal match.

Compressed Representation

Figure 2C:
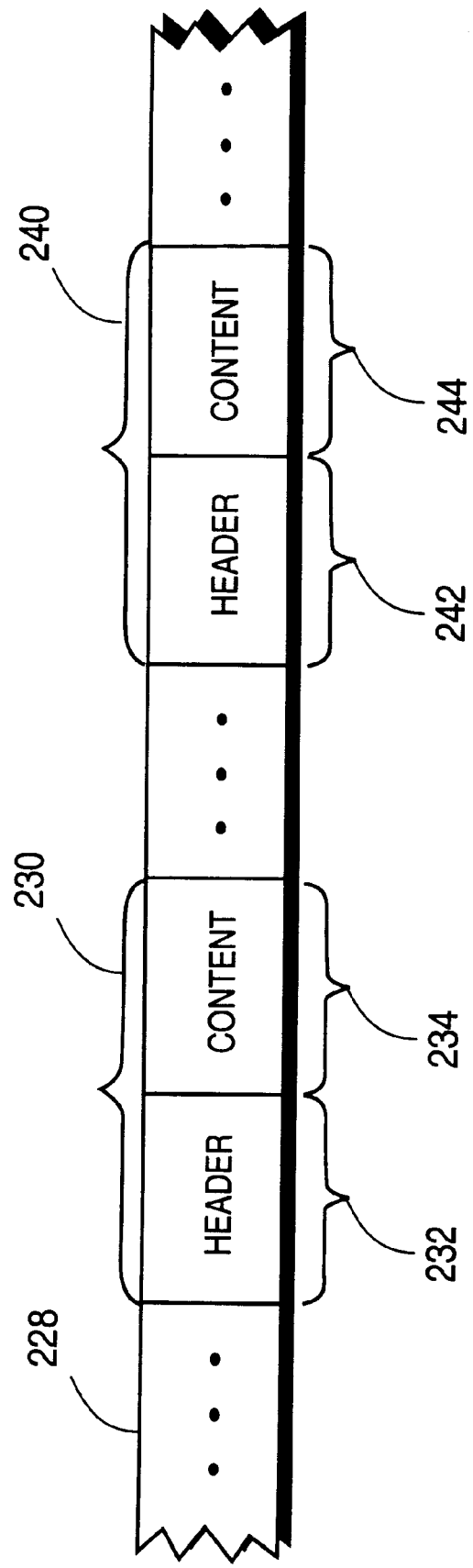
FIG. 2C provides an illustration of a format for an encoded representation according to an embodiment of the invention.

The result of a compression mechanism is a compressed representation of an input string. The compressed representation can contain the same value of an input string, or some compressed representation of the input string. For example, if a match exists between strings 210 and 220, string 220 can be replaced with an encoded representation of string 220 (e.g., a pointer to string 210). FIG. 2C provides an illustration of a format for an encoded representation according to an embodiment of the invention. Compressed representation 228 includes output from an encoding process. Preferably, a representation of an input string in compressed representation 228 begins on a byte boundary (e.g., the beginning of a byte).

String 210 is represented in compressed representation 228 as datum 230 which consists of header 232 and content 234. Header 232 specifies the type and length of content 234. For example, header 232 specifies that content 234 contains the value of string 210, which is L bytes long.

A header can specify that its associated content contains a pointer to a string that has already been decoded. Datum 240 represents string 220 in input string 206. Datum 240 includes header 242 and content 244. If, for example, a match existed between string 210 and 220, header 242 identifies the number of bytes that matched and identifies content 244 as a pointer to a previously-decompressed string 210.

A header can have a variable length. Where the header field is a variable length, a plurality of control bits can be included in the header field, for example, to ensure that a string's compressed representation falls on a byte boundary. For example, multiple consecutive headers that are each variable number of bits can be merged into a single byte to achieve byte alignment. To illustrate, if one header uses three bits, the remaining five bits can be used to store one or more consecutive headers, for example.

Dictionary Tree Creation and Utilization

Figure 3:
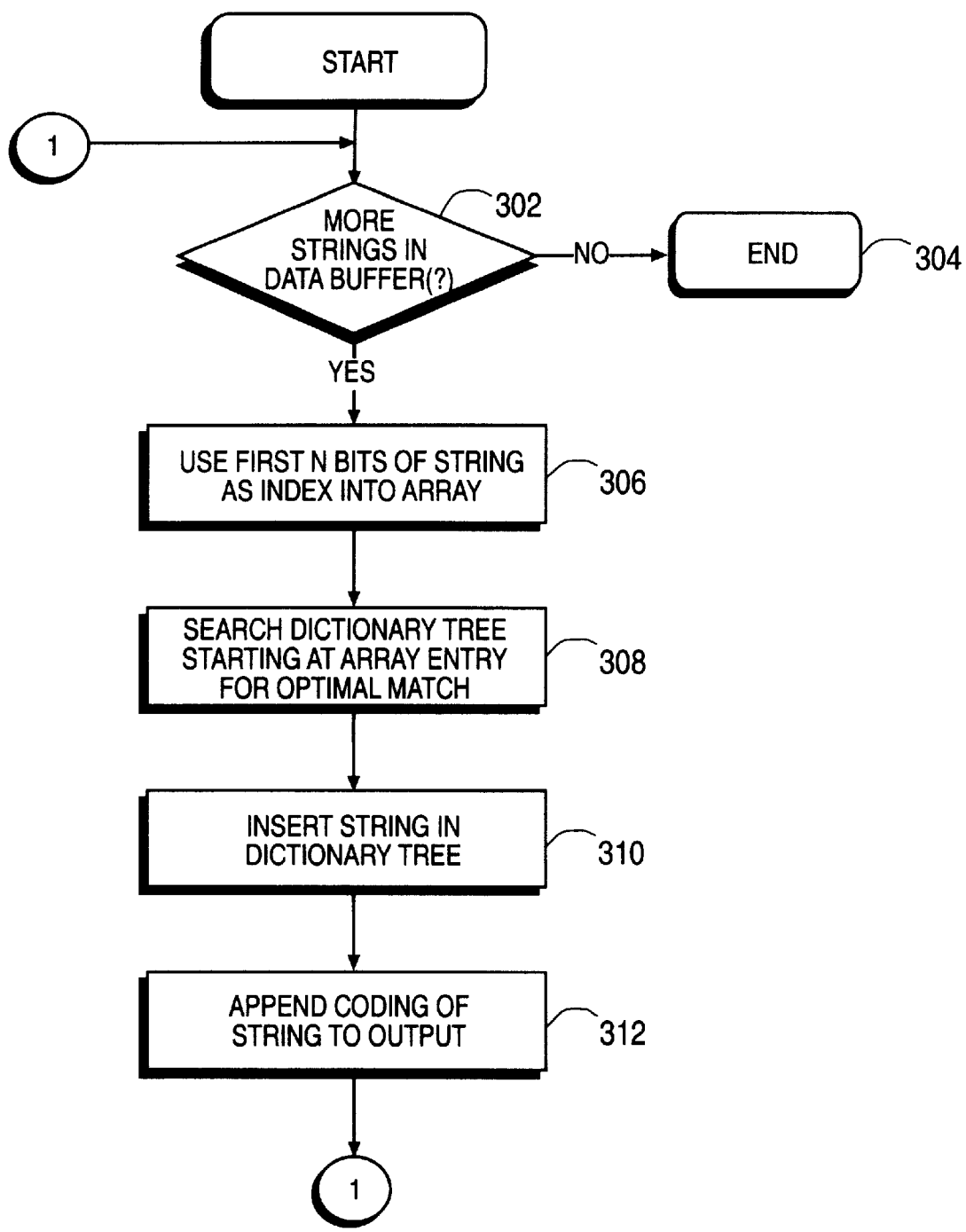
FIG. 3 provides a process flow for creating and using dictionary trees in processing strings contained in a data buffer according to an embodiment of the invention.

FIG. 3 provides a process flow for creating and using dictionary trees in processing strings contained in a data buffer according to an embodiment of the invention. The process flow assumes that the dictionary trees are stored in an array or table. However, it should be apparent that another technique can be used to store a dictionary tree.

At step 302 (i.e., "more strings in data buffer?"), a determination is made whether all of the strings in the data buffer have been processed. If so, processing ends at step 304. If not, processing continues at step 306 to use the first N bits of the string as an index into the array (e.g., array 202).

At step 308, the dictionary tree is searched beginning at the array entry to find the best match for the string. The traversal of the tree is more fully described below with reference to FIGS. 5A–5B. At step 310, the string is inserted into the dictionary tree. The encoded version of the string is appended to the encoding output. Processing continues at step 302 to process any remaining strings.

Variable-size Indexing

Referring to FIG. 2B, the value of N indicates the number of bits after a byte boundary that are used as an index into array 202. The value of N further specifies the number of entries for array 202. The number of entries in array 202 is $2^N$. Thus, for example, if N is set to eleven (11), array 202 has $2^{11}$, or 2048, entries. There can be a possible $2^N$ (e.g., 2048 where N is equal to 11) dictionary trees.

Various factors can be used to determine the value of N. Since each entry in array 202 is the root of a dictionary tree, a larger N increases the number of possible dictionary trees. As the number of dictionary trees increases, the number of entries in each tree decreases thereby reducing the number of comparisons that are performed to find an optimal match for a given string. The average traversal through a dictionary tree would require $\log_2 X$ where X is the number of strings already stored in the tree. Since there are N separate trees in the dictionary, a dictionary with X existing entries would only require $\log_2(X/N)$ string comparisons to find the optimal match.

For example, if N is equal to 11, array 202 has 2048 entries. Further, there are 2048 possible dictionary trees. If data buffer 206 is 4096 bytes, there will be two elements in each tree and it is only necessary to perform two comparisons to process a string to find an optimal match.

A smaller value of N reduces the size of array 202 which effects the initialization time and storage requirements. For example, array 202 contains 256 entries (and there are 256 dictionary trees) where N is equal to 8. If the address range is 2 bytes (e.g., data buffer 206 is 4096 bytes), array 202 is 512 bytes (i.e., 256 entries*2 bytes). In this case, it is only necessary to initialize an array comprising 512 bytes. Since there are 256 dictionary trees, there will be on average eight items in a tree. It would therefore be necessary to perform three comparisons, on average, to find an optimal match for a given string.

Thus, to minimize the number of comparison operations that must be performed, it is advantageous for N to be large. However, the larger N is the larger array 202 becomes. Thus, as N increases, the overhead needed to maintain array 202 increases. As indicated above, array 202 has $2^N$ entries. When N is equal to 16, array 202 has 64K entries. If each entry in array 202 must be 2 bytes long to store a pointer that has a 64K address range, array 202 is 64K entries with each entry being 2 bytes, or 128K. Array 202 must be initialized before data buffer 206 is encoded. Thus, if N is 16 bits and each entry is 16 bits, an 128K array must be initialized. The savings in resources (e.g., expenditures in processing time and storage) achieved from compressing could be negated due to the increased time needed to initialize array 202 and the storage requirements associated with an array for a large N. Therefore, it is important to select a value for N that furthers the efficiencies of the comparison process but does not result in an undue expenditure of resources (e.g., storage and processing to initialize storage).

Count

A count value is associated with each entry in a dictionary tree that identifies the number of initial bytes that are identical between the entry and its parent in the dictionary tree. The count value can be used to minimize the comparison operations that are needed to determine whether strings match.

For example, if the string "underarm" were in the dictionary and had the entry "underage" as its "lower" child, a count value of 6 would be associated with the "lower" child for the number of bytes that match with the parent (i.e., "underarm") link. If the parent link has a "higher" child link of "underbelly," a count value of 5 would be used to represent the number of bytes that match between the "higher" child and the parent.

Referring to FIG. 2A, an entry in dictionary tree 200 has an associated count field that identifies the number of characters that match between the entry and its parent. For example, entry ABCB has a count value of 3 indicating that the first three characters of ABCB match the first three characters of ABCDE.

The count value is used to minimize or possibly eliminate the comparisons that are performed to identify the dictionary entry that best matches the current string. Use of a count value to optimize search comparisons can be described for three cases. Assume, for the sake of example, that the current string being processed matches a string in the dictionary tree for matched bytes, the current string is before (or "lower" than) the dictionary string in sort order and the dictionary string matches count bytes with its "lower" link.

If matched<count, the current string matches matched bytes with the dictionary string's "lower" linked string (e.g., the string linked to and lower in value than the dictionary string) and is lower in value than the linked string, so the linked string's "lower" link can be examined and no string comparison on the linked string is necessary. If matched= count, the current string is compared to the dictionary string's "lower" link, but the comparison can begin after matched bytes into both strings.

If matched>count, the current string matches count bytes with and is higher in value than the dictionary string's "lower" link. Therefore, there is no need to compare the current string to the dictionary string's "lower" link. Instead, traversal changes to the "higher" link associated with the dictionary string's "lower" link.

These three cases can be illustrated with reference to FIG. 2A. Entries ABCDD, ABCE, and ABD reside at the lowest level of dictionary tree 200. The ABD string illustrates the case where count>matched. Dictionary tree 200 is traversed starting with entry ABCDE. Comparison of the ABD and ABCDE strings yields a matched value equal to 2. Since ABD is higher in value, the "higher" link of ABCDE (i.e., ABCX) is traversed. ABCX has a count equal to three (i.e., ABCX and ABCDE have the first three characters in common). Therefore, count is greater than matched.

Since ABCDE and ABD have only the first two characters in common, there is no need to compare ABD and ABCX. Such a comparison would yield the same value for matched. Since ABCDE and ABCX have the first three characters in common and ABD is higher in value than ABCDE, it is also known that ABD is higher in value than ABCX. The search for an optimal match continues down the "higher" branch of ABCX and the value of matched remains the same. The ABD string is added to the "higher" branch as the "higher" link of ABCX.

The count=matched case can be illustrated by the string ABCE. Traversal of dictionary tree 200 initially results in a matched equal to 3 from a comparison of ABCDE and ABCE. Since ABCE is higher in value than ABCDE, the "higher" branch is traversed (i.e., ABCX). The count associated with ABCX is equal to 3. Thus, matched and count are equal. There is no benefit in comparing the first three letters of ABCE and ABCX, since it has been determined that they are the same. The comparison operation can be optimized by skipping the first count characters. Comparing E with X (from the ABCE and ABCX strings, respectively) reveals that traversal of dictionary tree 200 should continue along the "lower" branch. The ABCE string is added to the end of dictionary tree 200 as the "lower" link or child of ABCX. A count value of 3 is associated with the ABCE entry.

The ABCDD string provides an example of the case where count<matched. A comparison of ABCDE and ABCDD results in a match of 4, and indicates that ABCDD is lower in value. Therefore, the search continues to ABCB (i.e., the "lower" link or child of ABCDE). The count value associated with ABCB is equal to 3 which is less than the matched value of 4.

Since matched>count and ABCB was lower in value than its parent (i.e., ABCDE), it can be assumed that ABCDD is higher in value than ABCB. That is, since ABCDD and ABCDE share the same fourth character and it is known that ABCDE differs from ABCB at the fourth character (i.e., ABCDE's fourth character is higher in value). It can, therefore, be assumed that ABCDD is also higher in value than ABCDE's "lower" child.

Therefore, there is no need to compare ABCDD to ABCB. Instead, traversal switches to the "higher" link of ABCB (i.e., a dictionary entry that is greater than ABCB), matched is set to the value of count, and the search continues. Since ABCB does not have a "higher" link, ABCDD is added to dictionary tree 200 as the "higher" child of ABCB.

Bifurcated Search With Count

Figure 5A:
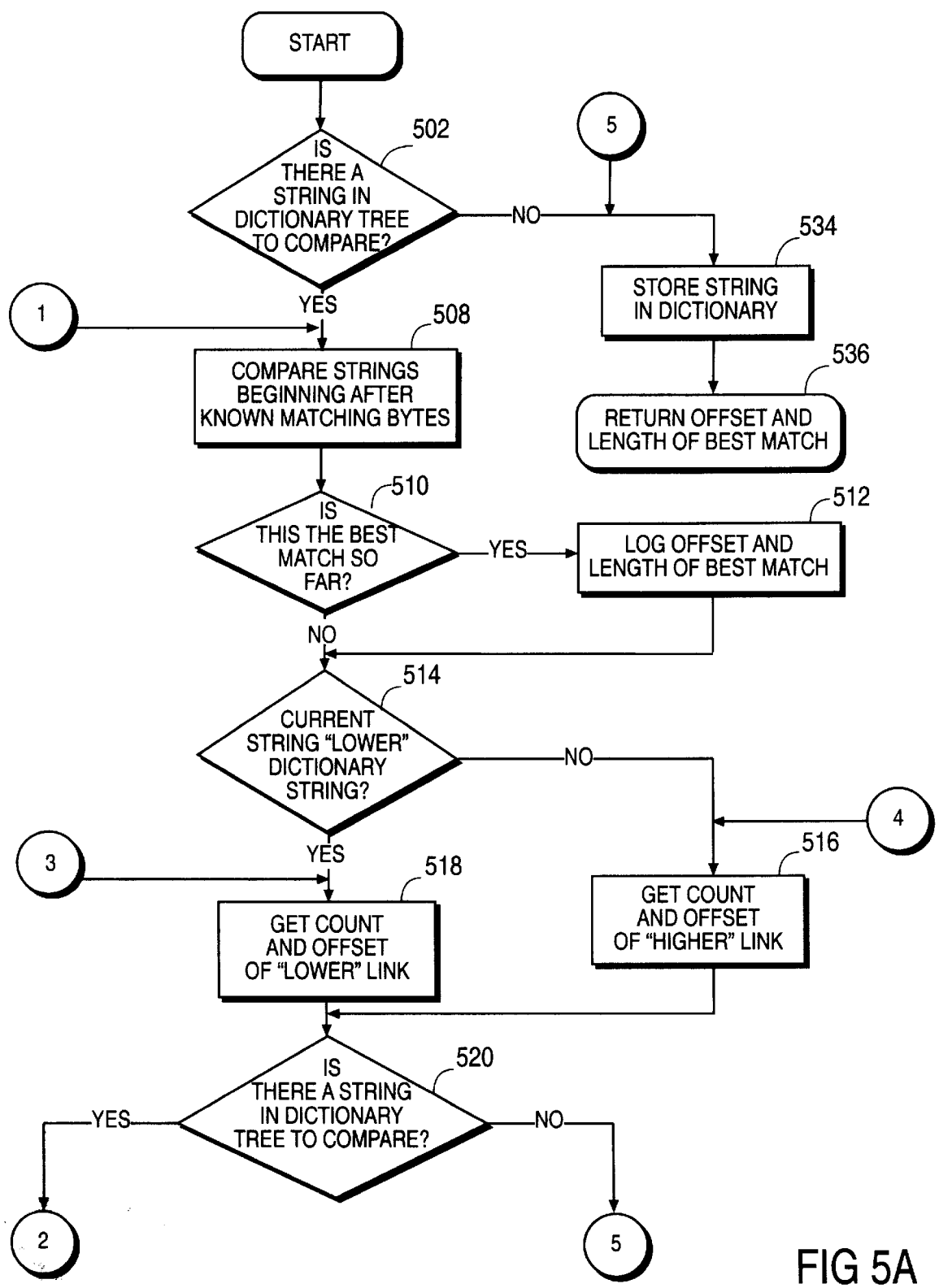
FIGS. 5A–5B provides a bifurcated search process flow using a count according to an embodiment of the invention.
Figure 5B:
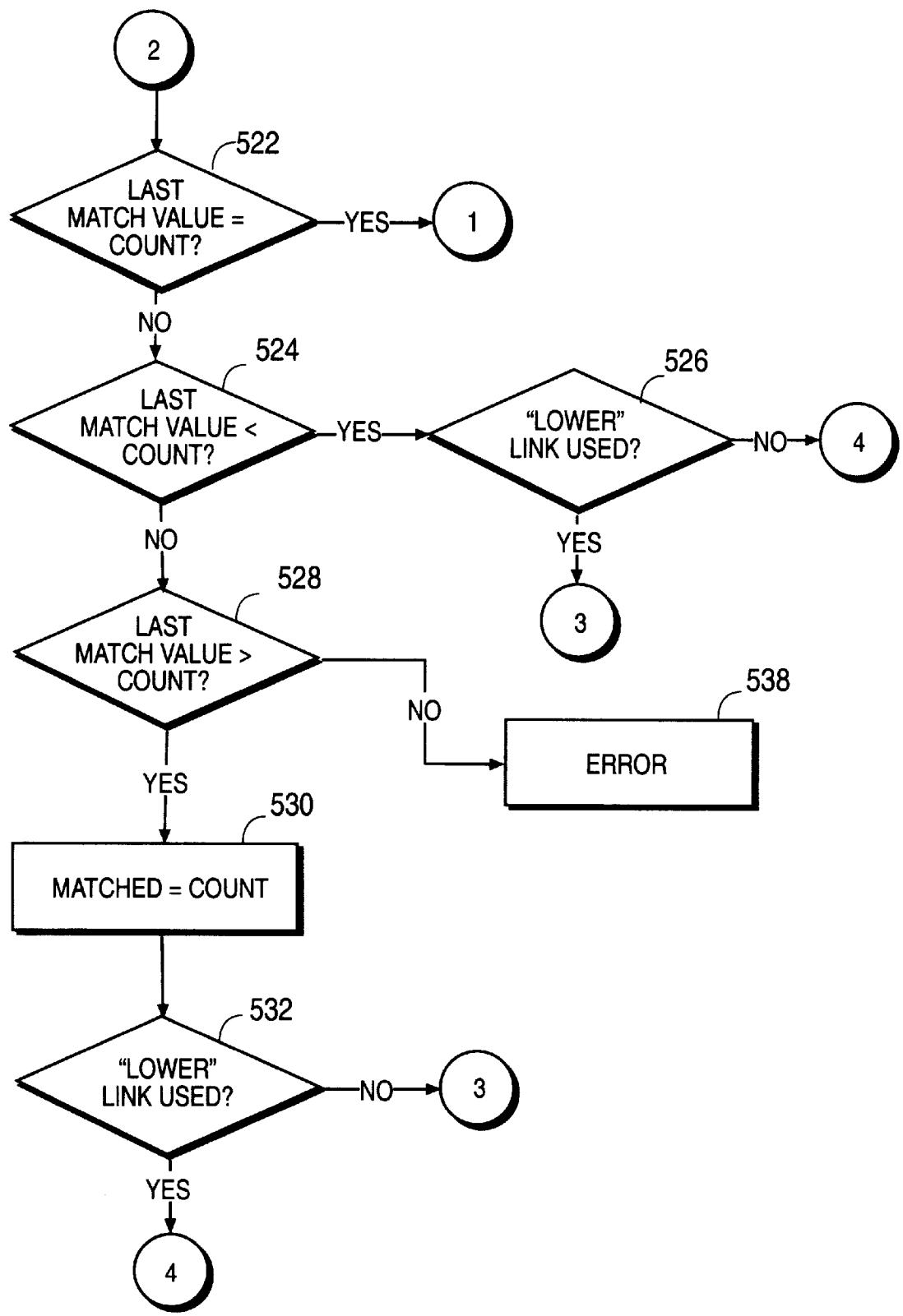

The bifurcated search arrays and the count value can be used to facilitate the search for an optimal match. The current string can be used to determine an index into the bifurcated search arrays (i.e., bifurcated dictionary trees). A pointer retrieved from a bifurcated search array can be used to identify another previous string that can be compared to the current string to locate an optimal match. FIGS. 5A–5B provides a bifurcated search process flow using a count according to an embodiment of the invention.

At step 502 (i.e., "is there a string in dictionary tree to compare?"), a determination is made whether there are any more strings in the dictionary tree to search. If not, processing continues at step 534 to store the string in the dictionary in the appropriate branch of the directory tree, and return the offset and length of the best match at step 536.

If there are additional dictionary strings to compare to the current string, processing continues at step 508 to compare the current string and the next dictionary string. If a value exists for matched, the comparison can be performed beginning with the character that succeeds the matched characters in the strings. At step 510 (i.e., "is this the best match so far?"), a determination is made whether the new value for matched is greater than the previous best value for matched. If so, processing continues at step 512 to log the offset and length of the best match, and processing continues at step 514. If not, processing continues at step 514.

At step 514 (i.e., "current string 'lower' dictionary string?"), a determination is made whether the current string is lower in value than the dictionary string. If it is lower, processing continues at step 518 to get the count and offset of the "lower" link. If it is determined to be higher in value, processing continues at step 516 to get the count and offset of the "higher" link. In both cases, processing continues at step 520 (i.e., "is there a string in dictionary tree to compare?") to determine whether step 516 or 518 yielded another dictionary tree entry. If not, processing continues at step 534 to store the string in the dictionary and return the offset and length of the best match. If there is another dictionary tree, processing continues at step 522.

At step 522 (i.e., "last match value=count?"), a determination is made whether matched is equal to the link's count value. If so, processing continues at step 508 to perform a comparison after the matched characters. If matched does not equal count, processing continues at step 524 (i.e., "last match value<count?") to determine whether matched<count. If so, processing continues to search using the same branch.

Thus, at step 526 a determination is made whether the "lower" or "higher" link was determined at step 514. If the "lower" link was selected to obtain the current dictionary string, processing continues at step 518 to get the next dictionary string using the same branching (i.e., the current dictionary string's "lower" link). If the "higher" link was used to get the last dictionary string, processing continues at step 516 to get the next dictionary string using the dictionary string's "higher" link. Processing continues at step 520 to determine whether the end of the dictionary tree has been reached.

If it is determined, at step 524, that matched is not less than count, processing continues at step 528 (i.e., "last match value>count?") to determine whether matched is greater than count. If not, processing continues at step 538 to raise an error. If matched>count, processing continues at step 530 to set matched equal to count. Searching continues by reversing the searching path. That is, if the "lower" link was used to obtain the current dictionary string, the "higher" link is used to get the next dictionary string, and vice versa.

Processing continues at step 532 (i.e., "'lower' link used?") to determine whether the "lower" link was previously used. If so, processing continues at step 516 to get the next dictionary string using the current dictionary string's "higher" link. If not, processing continues at step 518 to get the next dictionary string using the current dictionary string's "lower" link. Processing continues to process the remaining strings in the dictionary tree.

Bifurcation Arrays

Figure 4:
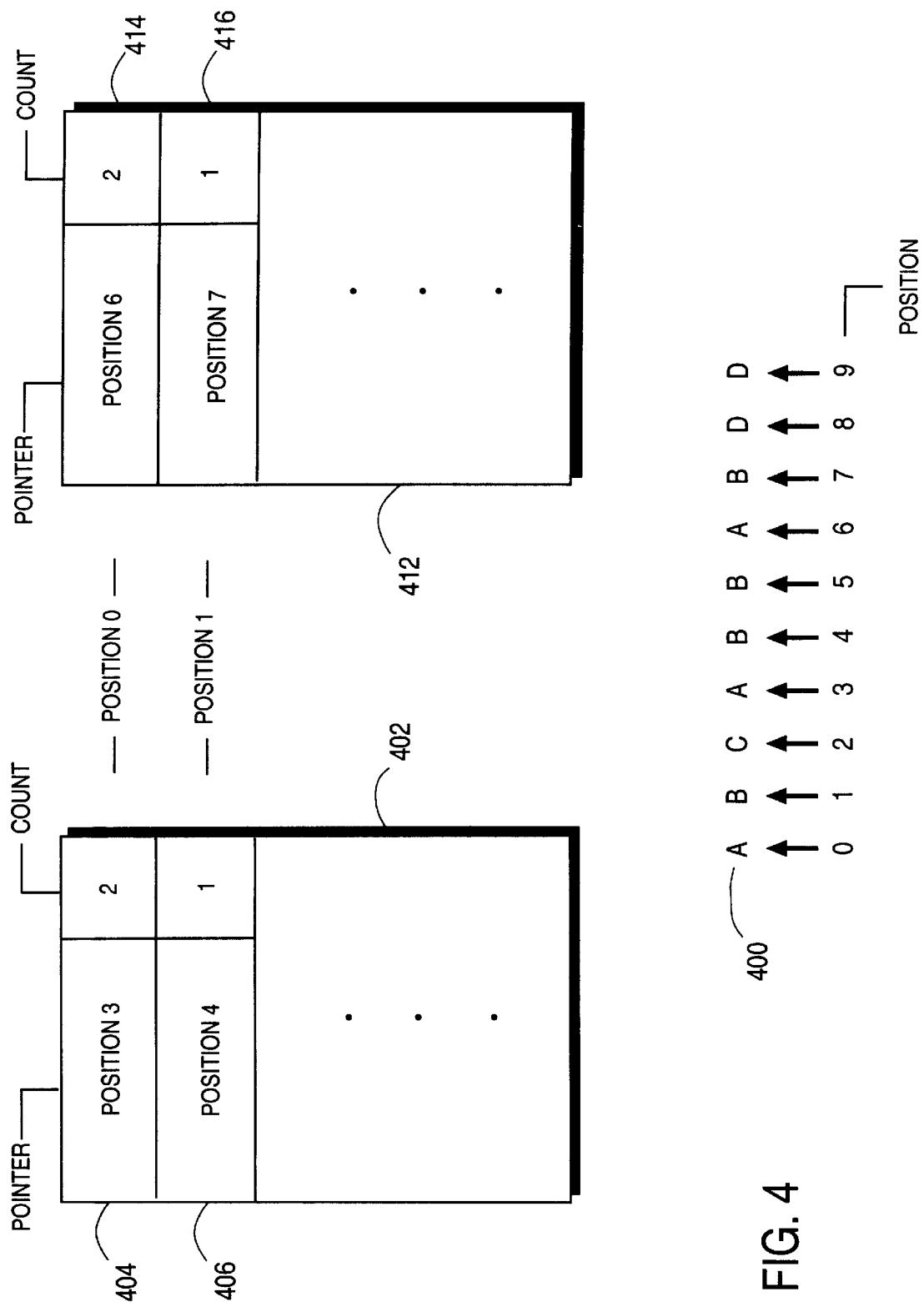
FIG. 4 provides an encoding example and bifurcation arrays for storing dictionary trees according to an embodiment of the invention.

As discussed with reference to FIG. 5, to determine whether a match exists, a current string is compared to a previous string in a dictionary tree, if a pointer to the previous string is found in array 202. The dictionary tree which has as its root the previous string referenced in an entry in array 202 is bifurcated. That is, each node in the tree can have two children nodes that represent a string in data buffer 206 that is lower in value and a string that is higher in value. FIG. 4 provides an encoding example and bifurcation arrays for storing dictionary trees according to an embodiment of the invention.

Arrays 402 and 412 contain pointers to strings in data buffer 400. Data buffer 400 consists of 10 characters, or bytes. The leftmost character in data buffer 400 holds the $0^{th}$ position. The rightmost character is located in the $9^{th}$ position. The position that the initial bit sequence of a string holds in data buffer 400 is used as an index into arrays 402 and 412. For example, the value of 1 is used as an index into arrays 402 and 412 for a string that begins at position 1 of data buffer 400.

Array 402 is referred to as the "lower" array, or table. Array 412 is referred to as the "higher" array, or table. Each entry in arrays 402 and 412 corresponds to a position in data buffer 400. For example, entry 404 of array 402 and entry 414 of array 412 correspond to the string that begins in the $0^{th}$ position of data buffer 400. An entry in array 402 contains a pointer to the first string that begins with the same sequence of bits (e.g., the same first byte) as the string beginning at position 0 of data buffer 400 but whose remaining sequence of bits is considered to have a lower value than the $0^{th}$ position string. In the example illustrated in FIG. 4, the number of bits in the first sequence of bits is equal to 8 (i.e., a byte). However, it should be apparent that the first, and remaining, sequence of bits can be any number of bits. An entry in array 412 contains a pointer to the first string encountered that begins with the same sequence of bits as the entries corresponding to the current position but whose remaining sequence of bits has a higher value.

To illustrate, the $0^{th}$ position of data buffer 400 contains a byte that represents the character a. The string that begins at position 0 has the characters abc. The next occurrence of a is located at position 3 in data buffer 400. Since the abb string is the next string that begins with a and its value is less than (e.g., alphabetically) the abc character string, a pointer to position 3 is stored in entry 404 of array 402 that corresponds with position 0 of data buffer 400.

Each entry in the arrays 402 and 412 identifies the position of a string in data buffer 400. The position information in arrays 402 and 412 can be used to locate the position of a string in data buffer 400. The referenced string is the string that is pointed to by a pointer contained in the array entry.

For example, entry 0 of array 402 (i.e., entry 404) corresponds to string abc beginning at position 0 of data buffer 400. Entry 0 contains a pointer to string abb beginning at position 3. The strings abc and abb have 2 characters in common. A value of 2 is placed in the count field of entry 404 in array 402.

A string that begins with the letter a that is greater in value alphabetically than the string that begins at position 0 of input string starts at position 6. A pointer is placed in array 412 in entry 414 that points to position 6 in data buffer 400. The first two characters of the strings abc and abd are the same. Therefore, a value of 2 is placed in the count field of entry 414.

The character string bca begins at position 1 of data buffer 400. The first string encountered in data buffer 400 that begins with b and is lower than the string bca (beginning at position 1) is string bba that begins at position 4. Further, only the first character in these strings is the same. Thus, a pointer to string bba (i.e., to position 4) is placed in the entry 406 and a value of 1 is placed in its count field. A pointer to position 7 is stored in entry 416 to identify the first string, bdd, encountered in data buffer 400 that begins with b and is higher in value (e.g., higher alphabetically) than the string bca (starting in position 1). A count of 1 is further stored in entry 416 to indicate that only the first character is the same in the two strings.

High Instance Tables

Embodiments of the invention further recognizes that there are entries in array 202 that may have much higher instance rates (i.e., may occur more frequently in a string input). For example, the zero entry (e.g., the entry that is comprised entirely of zeroes) may have a particularly large number of matching strings. Using the invention, another set of trees can be associated with such an entry. A special, second set of trees is used to avoid getting sequences that are too long and thereby maintain the high speed comparison process.

The high instance tables are used to reduce the number of strings in a dictionary tree. If, for example, a high number of strings have been found to begin with a string of zeroes, the dictionary tree that contains these strings is likely to be larger than other dictionary trees. If, however, the high instance table approach is used, the strings that would have been included in the "zero" dictionary tree are dispersed among the other dictionary trees. The string of zeroes are skipped over and another set of bits in the string are used as an index into the high instance dictionary trees.

Referring to FIG. 3, use of high instance tables modifies step 306 of FIG. 3. If a determination is made that the first N bits of the current string represent a value that is a high instance value (i.e., a value that has been found to occur more frequently in an input string or data buffer), the next M bits are used as an index into a high instance array (e.g., a second instance of array 202 that contains pointers to strings whose first N bits represent the high instance value). If the high instance array contains a pointer to a string, the string is used as the root of a dictionary tree that can be search through its links to find an optimal match. The same bifurcation arrays used for non-high-instance strings can be used for high-instance strings. M can be greater than, equal to, or less than N.

Internal String Matching

As discussed above, encoding is performed by looking at previous encoding input (i.e. strings that have already been placed in the dictionary tree). It should be noted that the strings in the dictionary tree need not be considered to end at the beginning of the string currently being processed. Therefore, a string could be found to match (in part) itself.

This can be illustrated by looking at the encoding of an input buffer which begins with seven consecutive a's (e.g., "aaaaaaax"). The first a (at position 0) gets processed when the dictionary tree is empty, so it will not match anything. The string beginning with the second a (at position 1) is then compared to the string beginning with the first a (at position 0). The second string matches the first string for six characters, and then the second string has an x character while the first string has an a character. Thus, the second string can be expressed as a six long match of the string at position 0. Five of those six matching characters are actually the first five characters of the second string. As long as the decoder decodes one byte at a time, the matching of the second string with part of itself will function correctly, and this "internal string matching" can improve the efficiency of the encoding.

Thus, a method and apparatus for high speed data searching has been provided.

We claim:

1. A method of searching information in a computer system comprising the steps of:
   identifying a parent string and a child string from data input, and a first value that represents the number of initial characters that said parent string and said child string have in common;
   comparing a subsequent string with said parent string to generate a second value that represents the number of initial characters that said parent and said subsequent string have in common;
   examining said first and second values to identify the extent of the comparison between said subsequent string and said child string;
   identifying a next string for comparison with said subsequent string when said first value is not equal to said second value;
   selecting a grandchild string using a first branch of a dictionary tree associated with said child string when said first value is greater than said second value.

2. A method of searching information in a computer system comprising the steps of:
   identifying a parent string and a child string from data input, and a first value that represents the number of initial characters that said parent string and said child string have in common;
   comparing a subsequent string with said parent string to generate a second value that represents the number of initial characters that said parent and said subsequent string have in common;
   examining said first and second values to identify the extent of the comparison between said subsequent string and said child string;
   identifying a next string for comparison with said subsequent string when said first value is not equal to said second value;
   selecting a grandchild string using a second branch of a dictionary tree associated with said child string when said first value is less than said second value.

3. The method of claim 1 wherein a pointer to said child string in said data input is stored in an entry of an array accessible using the position of said parent string in said data input.

4. An article of manufacture comprising:
   a computer usable medium having computer readable program code embodied therein for searching information in a computer system comprising:
      computer readable program code configured to cause a computer to identify a parent string and a child string from data input, and a first value that represents the number of initial characters that said parent string and said child string have in common;
      computer readable program code configured to cause a computer to compare a subsequent string with said parent string to generate a second value that represents the number of initial characters that said parent and said subsequent string have in common;
      computer readable program code configured to cause a computer to examine said first and second values to identify the extent of the comparison between said subsequent string and said child string;
      computer readable program code configured to cause a computer to identify a next string for comparison with said subsequent string when said first value is not equal to said second value;
      computer readable program code configured to cause a computer to select a grandchild string using a first branch of a dictionary tree when said first value is greater than said second value.

5. An article of manufacture comprising:
   a computer usable medium having computer readable program code embodied therein for searching information in a computer system comprising:
      computer readable program code configured to cause a computer to identify a parent string and a child string from data input, and a first value that represents the number of initial characters that said parent string and said child string have in common;
      computer readable program code configured to cause a computer to compare a subsequent string with said parent string to generate a second value that represents the number of initial characters that said parent and said subsequent string have in common;
      computer readable program code configured to cause a computer to examine said first and second values to identify the extent of the comparison between said subsequent string and said child string;
      computer readable program code configured to cause a computer to identify a next string for comparison with said subsequent string when said first value is not equal to said second value;
      computer readable program code configured to cause a computer to select a grandchild string using a second branch of said dictionary tree when said first value is less than said second value.

6. The article of manufacture of claim 4 wherein a pointer to said child string in said data input is stored in an entry of an array accessible using the position of said parent string in said data input.

7. A method of searching information in a computer system comprising the steps of:
   creating a first array of pointers to strings contained in an input buffer;
   creating a second array of pointers to strings that include a high occurrence sequence; said step comprising the steps of:
      determining whether a first sequence of bits of one of said strings matches said high occurrence sequence;
      accessing an entry in said second array using a second sequence of bits of said one of said strings;
      determining whether a pointer exists in said entry of said second array; and
      storing in said entry a pointer to said one of said strings, if a pointer does not exist in said entry;
   accessing said first array of pointers to identify a previous string, if a current string does not contain said high occurrence sequence;
   accessing said second array of pointers to identify said previous string, if said current string does contain said high occurrence sequence;
   comparing said previous string and said current string to determine whether a match exists; and
   generating a compressed representation that includes a pointer to said previous string, if a match does exist.

8. The method of claim 7 further comprising the steps of:
   identifying another previous string;
   comparing said another previous string and said current string to determine the number of initial characters in said another previous string and said current string that match.

9. The method of claim 8 wherein said step of identifying further comprises the steps of:

creating a "lower" array, an entry in said lower array is capable of storing a pointer to a lower-value string, said lower-value string being lower in value than said previous string;

creating a "higher" array, an entry in said higher array is capable of storing a pointer to a higher-value string, said higher-value string being higher in value than said previous string;

retrieving said another previous string using said pointer to said higher-value string in said higher array, if said current string is higher in value than said previous string; and retrieving said another previous string using said pointer to said lower-value string in said lower array, if said current string is lower in value than said previous string.

10. The method of claim 9 wherein said entry in said lower array and said entry in said higher array include a count, said count in said lower array entry identifying the number of initial bits in common between said previous string and said lower-value string and said count in said higher array entry identifying the number of initial bits in common between said previous string and said higher-value string.

11. An article of manufacturing comprising:
a computer usable medium having computer readable program code embodied therein for searching information comprising:
computer readable program code configured to cause a computer to create a first array of pointers to strings contained in an input buffer;
computer readable program code configured to cause a computer to create a second array of pointers to strings that include a high occurrence sequence;
computer readable program code configured to cause a computer to access said first array of pointers to identify a previous string, if a current string does not contain said high occurrence sequence;
computer readable program code configured to cause a computer to access said second array of pointers to identify said previous string, if said current string does contain said high occurrence sequence;
computer readable program code configured to cause a computer to compare said previous string and said current string to determine whether a match exists;
computer readable program code configured to cause a computer to generate a compressed representation that includes a pointer to said previous string, if a match does exist;
computer readable program code configured to cause a computer to determine whether a first sequence of bits of said current string matches said high occurrence sequence;
computer readable program code configured to cause a computer to access an entry in said second array using a second sequence of bits of said current string; and
computer readable program code configured to cause a computer to retrieve from said entry a pointer to said previous string.

12. An article of manufacturing comprising:
a computer usable medium having computer readable program code embodied therein for searching information comprising:
computer readable program code configured to cause a computer to create a first array of pointers to strings contained in an input buffer;
computer readable program code configured to cause a computer to create a second array of pointers to strings that include a high occurrence sequence;
computer readable program code configured to cause a computer to access said first array of pointers to identify a previous string, if a current string does not contain said high occurrence sequence;
computer readable program code configured to cause a computer to access said second array of pointers to identify said previous string, if said current string does contain said high occurrence sequence;
computer readable program code configured to cause a computer to compare said previous string and said current string to determine whether a match exists;
computer readable program code configured to cause a computer to generate a compressed representation that includes a pointer to said previous string, if a match does exist;
computer readable program code configured to cause a computer to identify another previous string; and
computer readable program code configured to cause a computer to compare said another previous string and said current string to determine the number of initial characters in said another previous string and said current string.

13. The article of manufacture of claim 12 wherein said computer readable program code configured to cause a computer to identify further comprises:
computer readable program code configured to cause a computer to create a "lower" array, an entry in said lower array is capable of storing a pointer to a lower-value string, said lower-value string being lower in value than said previous string;
computer readable program code configured to cause a computer to create a "higher" array, an entry in said higher array is capable of storing a pointer to a higher-value string, said higher-value string being higher in value than said previous string;
computer readable program code configured to cause a computer to retrieve said another previous string using said pointer to said higher-value string in said higher array, if said current string is higher in value than said previous string; and
computer readable program code configured to cause a computer to retrieve said another previous string using said pointer to said lower-value string in said lower array, if said current string is lower in value than said previous string.

14. The article of manufacture of claim 13 wherein said entry in said lower array and said entry in said higher array includes a count, said count in said lower array entry identifying the number of initial bits in common between said previous string and said lower-value string and said count in said higher array entry identifying the number of initial bits in common between said previous string and said higher-value string.

15. The article of manufacture of claim 12 wherein said computer readable program code configured to cause a computer to compare further comprises computer readable program code configured to cause a computer to compare the bits in said current string and said another previous string excluding the bits represented by said count.

16. An article of manufacturing comprising:
a computer usable medium having computer readable program code embodied therein for searching information comprising:

computer readable program code configured to cause a computer to create a first array of pointers to strings contained in an input buffer;

computer readable program code configured to cause a computer to create a second array of pointers to strings that include a high occurrence sequence;

computer readable program code configured to cause a computer to access said first array of pointers to identify a previous string, if a current string does not contain said high occurrence sequence;

computer readable program code configured to cause a computer to access said second array of pointers to identify said previous string, if said current string does contain said high occurrence sequence;

computer readable program code configured to cause a computer to compare said previous string and said current string to determine whether a match exists; and computer readable program code configured to cause a computer to generate a compressed representation that includes a pointer to said previous string, if a match does exist, wherein said compressed representation includes a header field, said header field having a variable length and identifying the type for an associated content field.

* * * * *